United States Patent [19]

McMillan et al.

[11] 4,151,410

[45] Apr. 24, 1979

[54] DOCUMENT PROCESSING, JAM DETECTING APPARATUS AND PROCESS

[75] Inventors: Andrew H. McMillan, Wayne; William B. Templeton, Howell, both of Mich.

[73] Assignee: Burroughs Corporation, Detroit, Mich.

[21] Appl. No.: 856,848

[22] Filed: Dec. 2, 1977

[51] Int. Cl.² ............................................. G01D 21/04
[52] U.S. Cl. ................................. 250/223 R; 271/263
[58] Field of Search ....................... 271/258, 262, 263; 250/223, 214 R, 566, 571, 557

[56] References Cited

U.S. PATENT DOCUMENTS 3,815,895  6/1974  Dufour ................................. 271/263
3,944,933  3/1976  Gallet ............................... 250/223 R Primary Examiner—David C. Nelms
Attorney, Agent, or Firm—Carl Fissell, Jr.; Robert L. Kaner; Kevin R. Peterson

[57] ABSTRACT

An apparatus and process for detecting document jams in a document processing apparatus by detecting the translucency of the documents. The disclosed apparatus includes a transport path for guiding documents and drive wheels for moving the documents along the transport path. An LED light source located on one side of the transport path illuminates at least a portion of the moving document as it passes along the transport path. A phototransistor light detector located on the other side of the transport path detects light from the LED that passes through translucent portions of the document. Electronics connected to the light detector indicate a document jam when the translucency of a document is generally unchanged for a period of time while the document is between the light source and light detector. The electronics includes circuitry for detecting the presence of a document, circuitry for detecting the absence of rapid changes in document translucency and circuitry for remembering the absence of such rapid changes in document translucency.

25 Claims, 6 Drawing Figures

DOCUMENT PROCESSING, JAM DETECTING APPARATUS AND PROCESS

CROSS REFERENCE TO OTHER APPLICATION

Cross reference is made to a patent application entitled "Document Overlap-Detecting Apparatus and Process", U.S. Ser. No. 873,082, filed on Dec. 23, 1977 which is assigned to common assignee. Such application discloses a document processing apparatus that detects overlapped documents by sensing given changes in document translucency.

BACKGROUND OF THE INVENTION

1. Field of the Invention

This invention relates in general to document processing systems; and more particularly to document jam detectors in such systems.

2. Description of the Prior Art

Document processing machines often move documents at high speeds with small interdocument spacings for efficiency. For various reasons, such as, for example, a bent corner, documents being processed can stop (jam) in the document transport path. It is desirable to detect such jams very rapidly because additional documents will be colliding with the jam. Such additional documents will probably be damaged, will increase the time required to clear the jam from the machine, and can also potentially damage the machine itself. Furthermore, the faster the document velocity, the more documents are likely to collide with the jam before the machine can be shut down. Thus, it is desirable to detect document jams very rapidly in document processing machines.

U.S. Pat. No. 3,815,895 issued to Dufour discloses a book manufacturing machine having a jam detector. The machine has several synchronized processing stations that sequentially operate to cut and fold signatures (paper) for books. The sequential processing stations are synchronized by a common drive mechanism; and light sources and photocells are used to detect the presence or absence of signatures at predetermined locations at discrete monitor times. The discrete monitor times are indicated by the position of the common drive mechanism. The disclosed jam detector, however, detects only the presence or absence of an object at discrete times and hence normally has a rather lengthy inherent delay before it can indicate that a jam has occurred.

U.S. Pat. No. 3,150,873 issued to MacGregor discloses a document processing apparatus having a jam detector associated with a document transport path. The jam detector utilizes at least two sets of light source-photocell pairs. Each light source-photocell pair is located along the transport path and detects the presence or absence of a document in the transport path at that location. A jam is detected if a document passes between a first light source-photocell pair and does not pass between a second downstream light source-photocell pair within a given time. The given time is defined by the distance between the first and second light source-photocell pairs and the expected velocity of the document. This jam detector, however, detects only the presence or absence of a document and also normally has a rather lengthy inherent delay before it can indicate that a jam has occurred.

SUMMARY OF THE INVENTION

The present invention provides a jam detector that operates very rapidly to minimize the effect of a document jam upon other documents the system is processing. The jam detector of the present invention detects the translucency of a document and indicates a document jam when the translucency of the document is generally unchanged while the document is present between a light source and a light detector.

An apparatus for detecting jams in a document processing system according to the present invention includes an illuminating means located adjacent one broad surface of the moving document for illuminating a portion of the moving document. A detecting means located adjacent the opposite broad surface of the moving document detects light that passes through translucent portions of the document as the document is between the illuminating means and the detecting means. Electronic means are connected to the detecting means and indicate when a document jam occurs between the illuminating means and the detecting means. The electronic means indicates a document jam (a stopped document) when the translucency of the document is generally unchanged for a period of time while the document is between the illuminating means and the detecting means.

The present invention utilizes document translucency to detect jams. In general, different areas of the same document have different translucencies. Thus, the output of the detecting means changes due to these changes in the document's translucency as the document normally moves past the jam detector. If the translucency does not change, this indicates that the document has jammed and stopped. Utilizing translucency detection, a document jam can be detected, once the document has stopped, in a time that corresponds to one-half inch (1.27 cm) of document travel at nominal document velocity. Thus, the present invention can detect jams very rapidly such that fewer documents become jammed and damaged.

Normally, different areas of the same document have different translucencies due to factors such as the fibers in the document, the varying thickness of the document and the printing or other marks thereon. If a document were to have a perfectly consistent translucency, which is very unlikely, then it would be possible to get extraneous jam indications utilizing the present invention.

The illuminating means of the preferred embodiment is a Light Emitting Diode (LED) that provides primarily infrared radiation (IR). Such frequency of light is used because it is believed to be more sensitive to changes in the fibers of and thickness variations of documents, and less sensitive to the color of and marks on documents (the visible frequencies) which occur more at random. However, it is believed that other types of light besides IR could possibly be used in the present invention.

The detecting means of the preferred embodiment is a light sensitive phototransistor that has a logarithmic light input to electrical output transfer characteristic. Stated more particularly, the base-emitter voltage of the transistor is logarithmically related to the collector current of the phototransistor, which current is linearly related to the light intensity impinging on the phototransistor over some range. This logarithmic relationship permits the detector to be used over a wide range of light intensities and hence the detector can be used with documents having a wide range of translucencies. Thus, documents from tissue-like paper to cardboard-like material can be intermixed and used with the same jam detector. The logarithmic relationship also provides a highly sensitive response regardless of the nominal translucency of a particular document. For example, because of the logarithmic relationship, a given percentage change in the light impinging on the phototransistor will provide the same magnitude of voltage change across the base-emitter junction of the transistor regardless of the initial magnitude of the light. Thus, the detector is sensitive over a broad range of light intensities and provides an output that is easily analyzable.

The electronic means of the preferred embodiment includes an amplifier, a high pass filter, a dual threshold detector, a low pass filter and a trigger circuit. The amplifier receives the output of the light detecting means and amplifies it. The output of the amplifier is input to a high pass filter whose output indicates rapid changes in translucency. The output of the high pass filter is input to dual threshold detectors which indicate when such rapid changes exceed a predetermined magnitude. The output of the threshold detectors is input to a low pass filter that remembers the duty cycle of the rapid changes over a period of time. The output of the low pass filter is input to a trigger circuit that indicates when the translucency of the document is generally unchanged for the period of time.

DETAILED DESCRIPTION OF THE INVENTION

Figure 1:
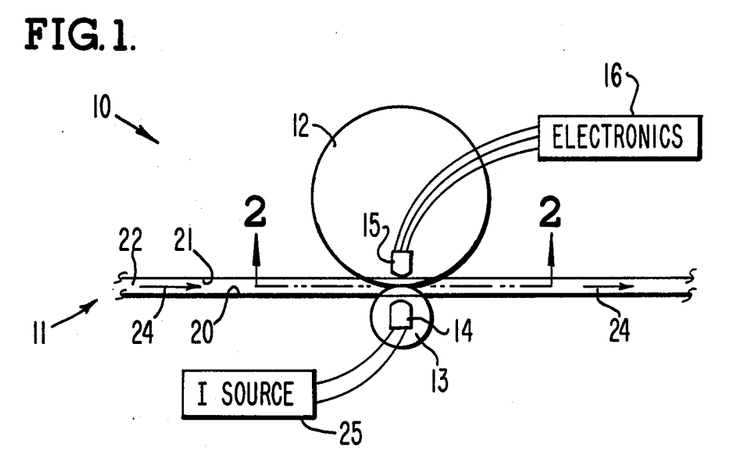
FIG. 1 is a top view of a document jam detecting apparatus according to the present invention.
Figure 2:
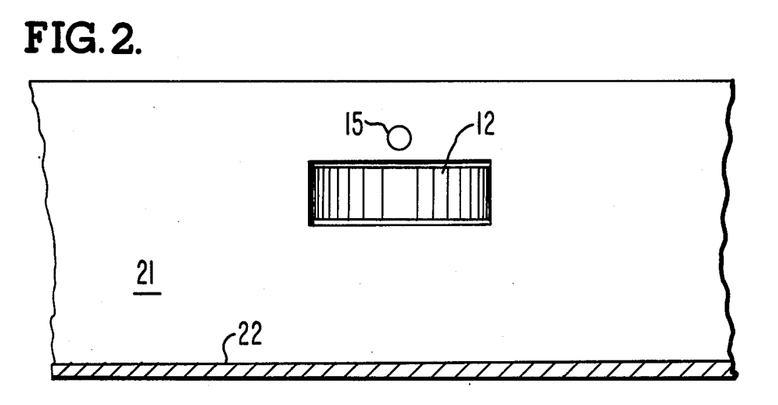
FIG. 2 shows a front, sectional view taken along the line 2—2 of FIG. 1.

An apparatus 10 that detects doument jams in a moving document system according to the present invention is shown in top view in FIG. 1, A moving document system may, for example, process bank checks, detect magnetic and/or optical characters thereon, and appropriately sort such checks. The apparatus 10 includes a transport path 11, a set of document drive rollers 12 and 13, a light source 14, a light detector 15 and electronics 16, which electronics indicate when the translucency of the document is generally unchanged.

The transport path 11 is formed by a pair of generally opposed walls 20 and 21 that are connected by a bottom wall 22, which bottom wall is generally perpendicular to the walls 20 and 21. The transport path guides the documents as they pass serially through the apparatus in the direction of the arrows 24.

The documents are driven along the transport path 11 by sets of drive rollers located at regular or irregular intervals. Each set of drive rollers includes a drive wheel 12, rotated by a motor via pulleys and drive belts located under the surface of the apparatus, and an idle roller 13 which is spring loaded against the drive wheel 12. The drive wheel-idle roller sets may, for example, drive documents down the transport path at a velocity of 75 inches per second (190 cm per second). The drive wheel-idle roller sets form a means for moving the documents along the transport path.

As the documents pass through the apparatus, they pass between the light source 14 and the light detector 15 that are located on opposite sides of the transport path and in line with each other. The source 14 and detector 15 are preferably mounted flush with or slightly recessed from their respective walls 20 and 21. The source 14 and detector 15 are located at one of the drive wheel-idle roller sets because this insures an accurate placement of the document within the width of the transport path thus virtually eliminating any translucency changes along a document's length caused by the document moving from side to side within the transport path.

The light source 14 may be provided by a light emitting diode (LED) such as a Spectronics SE-5455. A current source 25 may be connected to and supply 50 milliamps of current to the LED to supply a constant illumination. The LED provides primarily infrared radiation which is believed to be more sensitive to changes in the fibers of and thickness variations of documents, and less sensitive to the color of or marks on documents which occur more at random. Such infrared radiation will more easily pass through thick and darkly colored documents than visible radiation can. The light source 14 and its associated bias circuitry provide a means located adjacent one surface of the document for illuminating a portion of the document.

Figure 3:
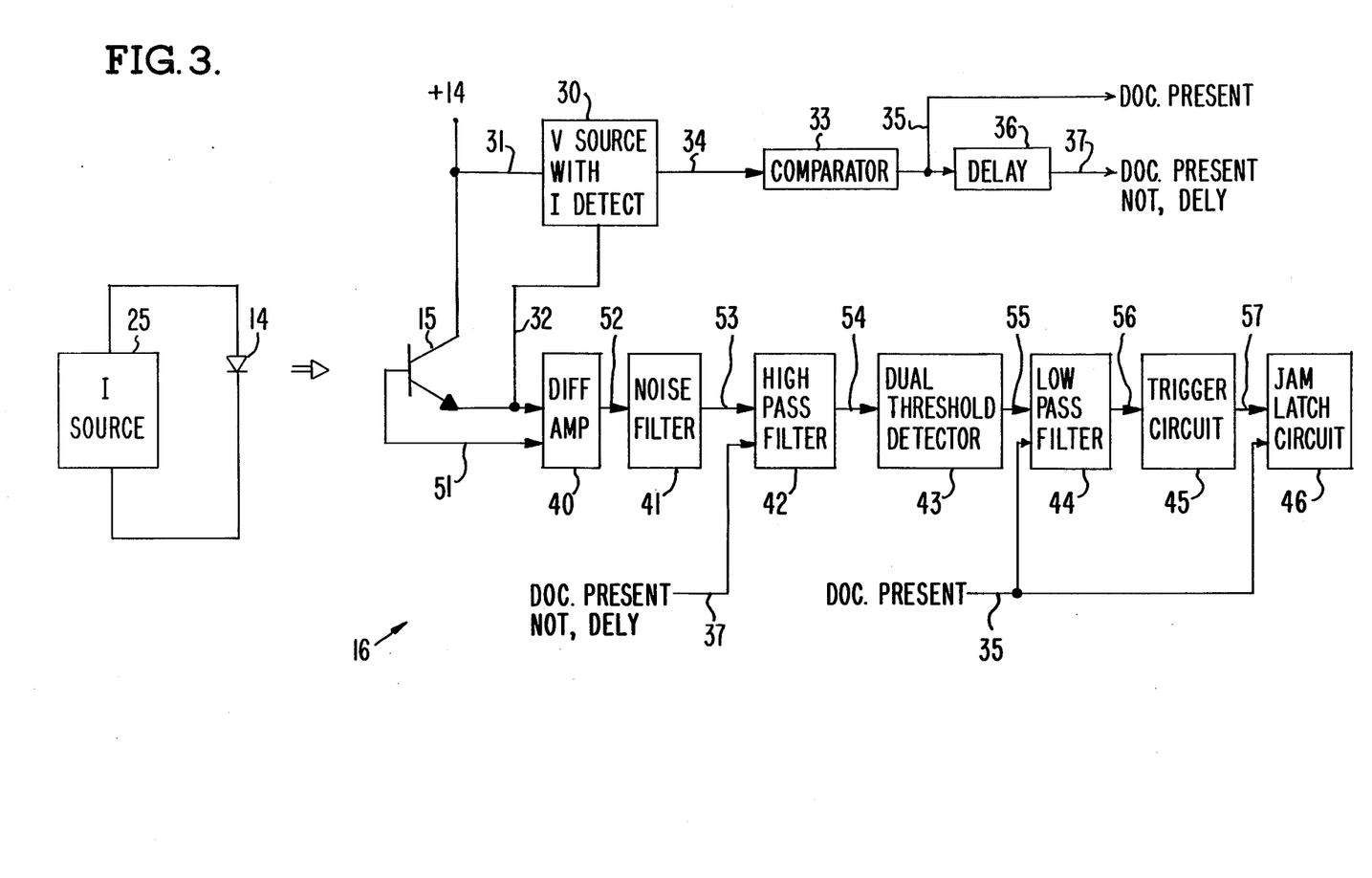
FIG. 3 shows an electrical block diagram for the light source, light detector and electronics blocks of FIG. 1.

The light detector may be provided by a light-sensitive phototransistor such as a Spectronics SD-5443. Referring to FIG. 3, a voltage source 30 may supply four volts of bias between the phototransistor's collector and emitter via conductors 31 and 32. The phototransistor has a logarithmic relationship between its light input and its base-emitter voltage over a certain range. This logarithmic relationship permits the detector (and the apparatus) to operate over a wide range of light intensities and hence the detector can be used with documents having a wide range of translucencies. Thus, documents from tissue-like paper to cardboard-like material can be intermixed and used with the same jam detector without any adjustment being required.

The detector 15 will of course provide different levels of output depending on the translucency of the particular document between the light source and the light detector. In addition, as a particular document passes between the light source and light detector, the output of the detector will vary due to factors such as the fibers in the document, the thickness variations of the document and the printing or other marks on the document. The light detector 15 and its associated bias circuitry provide a means located adjacent the opposite surface of the document for detecting the magnitude of light that passes through translucent portions of the document as the document is between the light source and the light detector.

Figure 4:
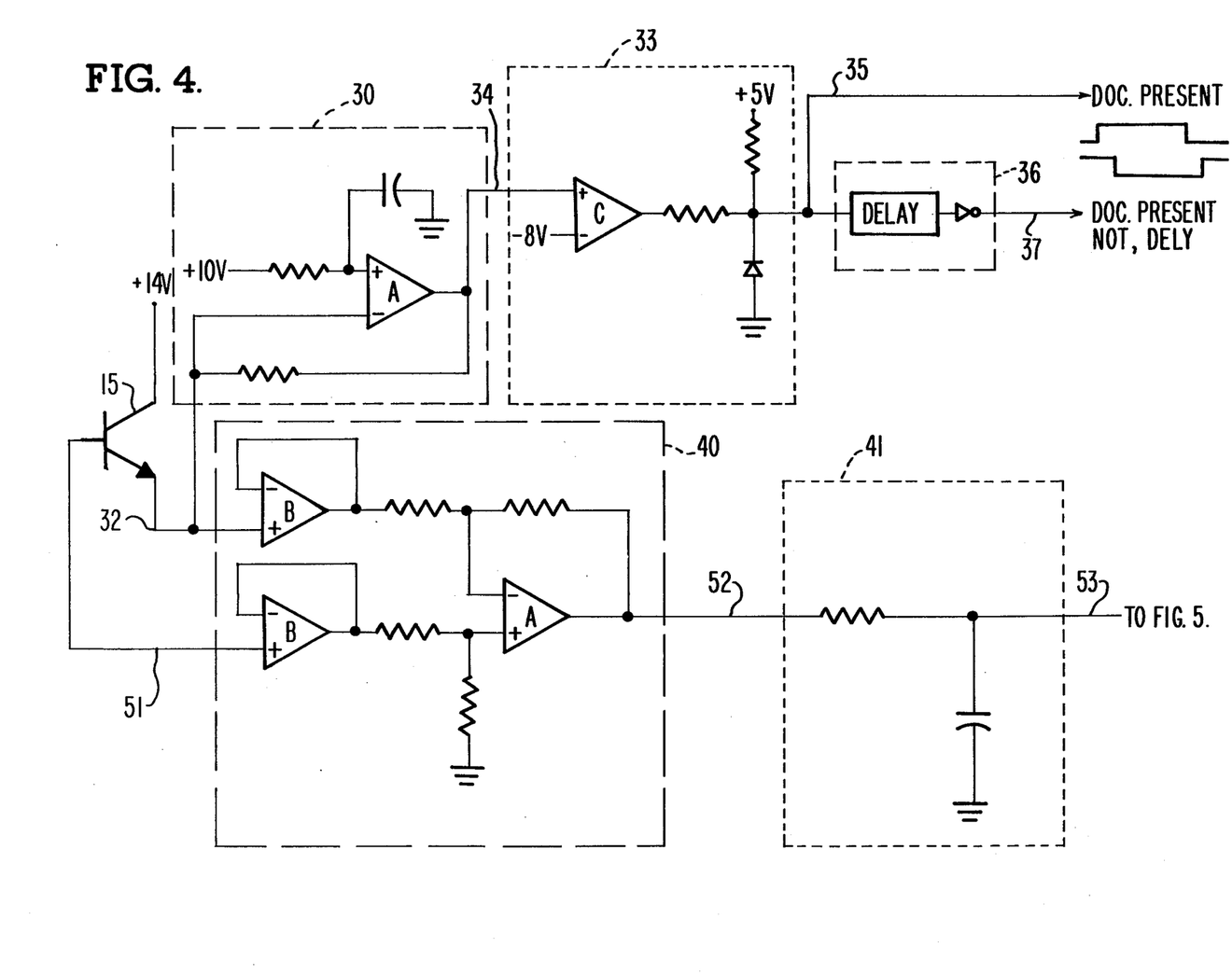
FIGS. 4 and 5 show detailed schematics of circuitry that can be used to provide the electronics blocks of FIG. 3.
Figure 5:
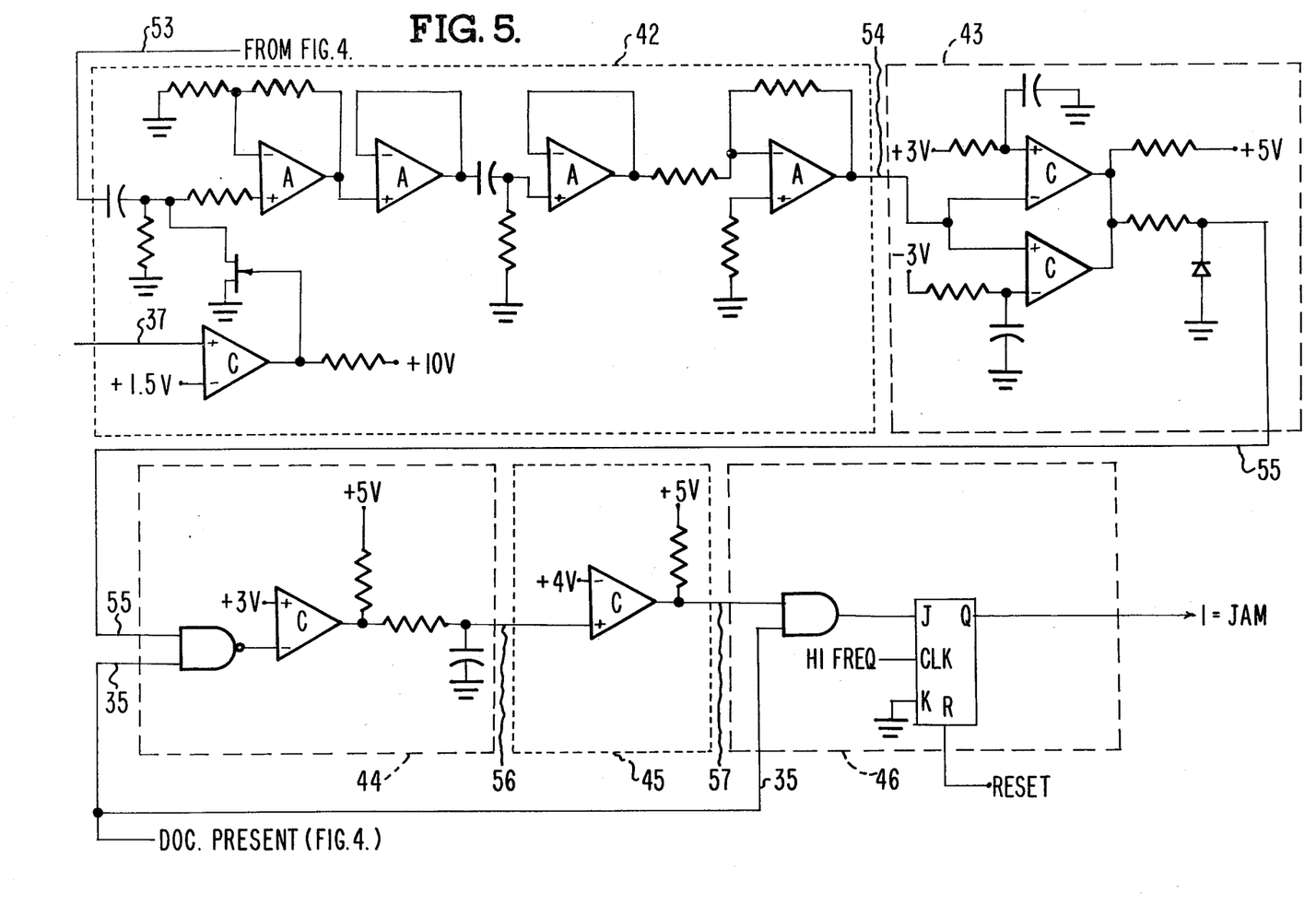

The electronics 16 is electrically connected to the detector 15, monitors and analyzes the output of the detector 15, and indicates when the translucency of a document is generally unchanged while the document is between the light source 14 and the light detector 15. FIG. 3 shows a block diagram of the electronics 16 while FIGS. 4 and 5 show circuitry that may be used to provide the various blocks.

Comparator 33 together with voltage source 30 designates when a document is present between the light source and the light detector. As previously stated, source 30 provides a four volt bias across the collector-emitter of phototransistor 15. Source 30 also provides a current sense resistor in series with the bias supply to provide a voltage on conductor 34 that is representative of the phototransistor's emitter current. Comparator 33 monitors the voltage on conductor 34 and indicates with a TTL logic level 1 on conductor 35 when a document is present. Comparator 33 together with voltage source 30 provides a means for designating when a document is present between the illuminating means and the detecting means; and such document present designating means forms part of the indicating means of the present invention. Alternatively, the document present designating means could be provided utilizing an additional light source and light detector together with suitable current detecting circuitry to indicate when a document is present. Such alternative document present designating means would of course be considered a part of the indicating means of the present invention.

The document present signal on conductor 35 is input to a delay circuit 36. Delay circuit 36 provides approximately 1.3 milliseconds of delay (corresponding to 0.1 inch of document travel at 75 inches per second) and inverts the signal on conductor 35 to provide a DOC PRESENT NOT, DELY signal on conductor 37.

The electronics 16 also indicates when the translucency of a document is generally unchanged. The translucency monitor electronics comprises a differential amplifier 40, a noise filter 41, a high pass filter 42, a dual threshold detector 43, a low pass filter 44, a trigger circuit 45 and a jam latch circuit 46.

The output of the detector 15 is input to the translucency monitor electronics via conductors 32 and 51. The detector 15 will, for example, provide voltage variations greater than 116 microvolts (between conductors 32 and 51) due to translucency changes as a document passes thereby. The voltage between conductors 32 and 51 is input to differential amplifier circuit 40. Circuit 40 provides a high input impedance noninverting buffer amplifier having a gain of one for each of the signals on conductors 32 and 51. The outputs of these buffer amplifiers are input to a differential amplifier which has a gain of 10 and provides an output on conductor 52 referenced to a monitor electronics ground. Differential amplifier circuit 40 provides the amplifier means of the indicating means in the preferred embodiment.

The output of amplifier circuit 40 on conductor 52 is input to the optional noise filter 41. Noise filter 41 may be a first order, passive, RC, low pass filter having a time constant of 34 microseconds. This filter eliminates any extraneous very high frequency signals.

The output of filter 41 on conductor 53 is input to the high pass filter 42. Briefly, filter 42 differentiates the signal on conductor 53 and amplifies the differentiated signal to provide on conductor 54 a signal representative of rapid changes in the output of the detector 15.

Referring more particularly to the filter block 42, the signal on conductor 53 may be input to a first, first order, passive, RC, high pass filter having a time constant of 6.3 milliseconds. This filter blocks the DC (low frequency) component of the output of detector 15 to provide a signal representative of the rapid change in the output of the detector 15. The time constant of this first RC filter can be switched to be approximately 10 microseconds by the DOC PRESENT NOT, DELY signal on conductor 37. Thus, while no document is present or for the first 1.3 milliseconds a document is present, the filter has the shorter time constant and the capacitor in the filter rapidly charges to the level on conductor 53. After a document is present for 1.3 milliseconds, then the first RC filter is switched to the 6.3 millisecond time constant. In this latter state, the first filter still differentiates the signal on conductor 53, but the longer time constant widens the signal waveform out of the filter. The differentiated signal from the filter may then be amplified by a non-inverting amplifier having a gain of 38 and a noninverting buffer amplifier having a gain of 1. The output of the latter amplifier is input to a second, first order, passive, RC, high pass filter having a fixed time constant of 610 microseconds. This filter again differentiates the signal; and the output of this filter is in turn amplified by a noninverting buffer amplifier having a gain of 1 and an inverting amplifier having a gain of 68. Thus, the filter block 42 blocks the DC component of the output of the detector 15; differentiates its input with two, first order, passive, RC, high pass filters having time constants of 6.3 milliseconds and 610 microseconds; and amplifies the differentiated signal by 2584 (38×68). Thus, a rapid change of 116 microvolts in the output of the detector 15 will provide an appropriate plus or minus 3 volt output from the filter 42 on conductor 54. The filter 42 provides a means for detecting rapid changes in the output of the detector in the preferred embodiment.

The output of high pass filter 42 on conductor 54 is input to dual threshold detector block 43. Block 43 has two comparators (threshold detectors) with one comparator triggering at +3 volts on conductor 54 and the other comparator triggering at −3 volts on conductor 54. When the signal on conductor 54 is greater than +3 volts or less than −3 volts, the threshold detector 43 provides a TTL logical 0 level on conductor 55; and when the signal on conductor 54 is between ±3 volts, threshold detector 43 provides a TTL logical 1 level on conductor 55. Thus, a logical 0 level is provided on conductor 55 whenever the output of detector 15 provides a sudden change of magnitude greater than 116 microvolts. The dual threshold detector block 43 provides a comparator means for indicating when the rapid changes exceed a predetermined value.

The output of threshold detector 43 on conductor 55 is input to low pass filter 44 together with the document present signal on conductor 35. The document present signal is used to enable the low pass filter 44 such that the filter is discharged and remains discharged when a document is not present. The signals on conductors 55 and 35 are input to an open collector AND gate (provided by a NAND gate and an inverting comparator) which provides a logical 1 (open) output whenever a document is present and the output of detector 15 changes less than 116 microvolts, and a logical 0 (ground) output whenever a document is not present or the output of detector 15 is rapidly changing by more than 116 microvolts. This open collector AND gate in turn enables or disables a first order, passive, RC, low pass filter having charge and discharge time constants of approximately 4.7 milliseconds. Thus, the low pass filter 44 averages the duty cycle of the signals on conductor 55 when a document is present and provides an analog voltage on conductor 56. This analog voltage is greater when the output of detector 15 remains generally unchanged while a document is present and is less when the output of detector 15 changes rapidly while a document is present. The time constant of the filter 44 in essence establishes a predetermined time over which the translucency must be generally unchanged. The low pass filter 44 provides a means for remembering rapid changes, or the absence thereof, in the output of the detector 15.

The output of filter 44 on conductor 56 is input to trigger circuit 45. Trigger circuit 45 may be provided by a comparator that provides a TTL logical 1 level on conductor 57 whenever the output of the low pass filter on conductor 56 exceeds a predetermined value. Thus, trigger circuit 45 provides a logical 1 level on conductor 57 whenever the output of the detector 15 is generally unchanged while a document is present. Trigger circuit 45 provides a means for deciding when the output of the detector 15 is generally unchanged in the preferred embodiment.

The output of trigger circuit 45 on conductor 57 is input to jam latch circuit 46 together with the document present signal on conductor 35. Latch circuit 46 is set whenever a document is present and the output of the trigger circuit 45 indicates the translucency of the document is generally unchanged.

To briefly review the operation of the translucency electronics, differential amplifier 40 amplifies the base-emitter voltage of phototransistor 15 by 10. Noise filter 41 eliminates extraneous very high frequency noise. High pass filter 42 blocks the DC component of the signal, differentiates the signal and amplifies it by 2584 to provide a signal output whose magnitude represents rapid changes in the translucency of the document. Dual threshold detector 43 provides a logic level signal output that changes with time and indicates when the rapid changes in translucency of the document do not exceed predetermined magnitudes. Low pass filter 44 is enabled when a document is present and time averages the output of threshold detector 43 (i.e. time averages when the rapid changes in translucency of the document do not exceed predetermined magnitudes). When the output of low pass filter 44 builds up sufficiently to indicate that the document translucency is generally unchanged while a document is present, trigger circuit 45 is activated to indicate that a document has jammed between the light source and the light detector.

As previously stated, FIGS. 4 and 5 show circuitry that may be used to provide blocks shown in FIG. 3. In FIGS. 4 and 5, the amplifiers labeled A may be of the UA747 type; the amplifiers labeled B may be of the TL084 type; and the comparators labeled C may be of the CA339 type. The amplifiers and comparators in blocks 30, 33, 40, 42, and 43 are powered by +14 vdc and −12 vdc; and the comparators in blocks 44 and 45 are powered by +12 vdc and ground.

Figure 6:
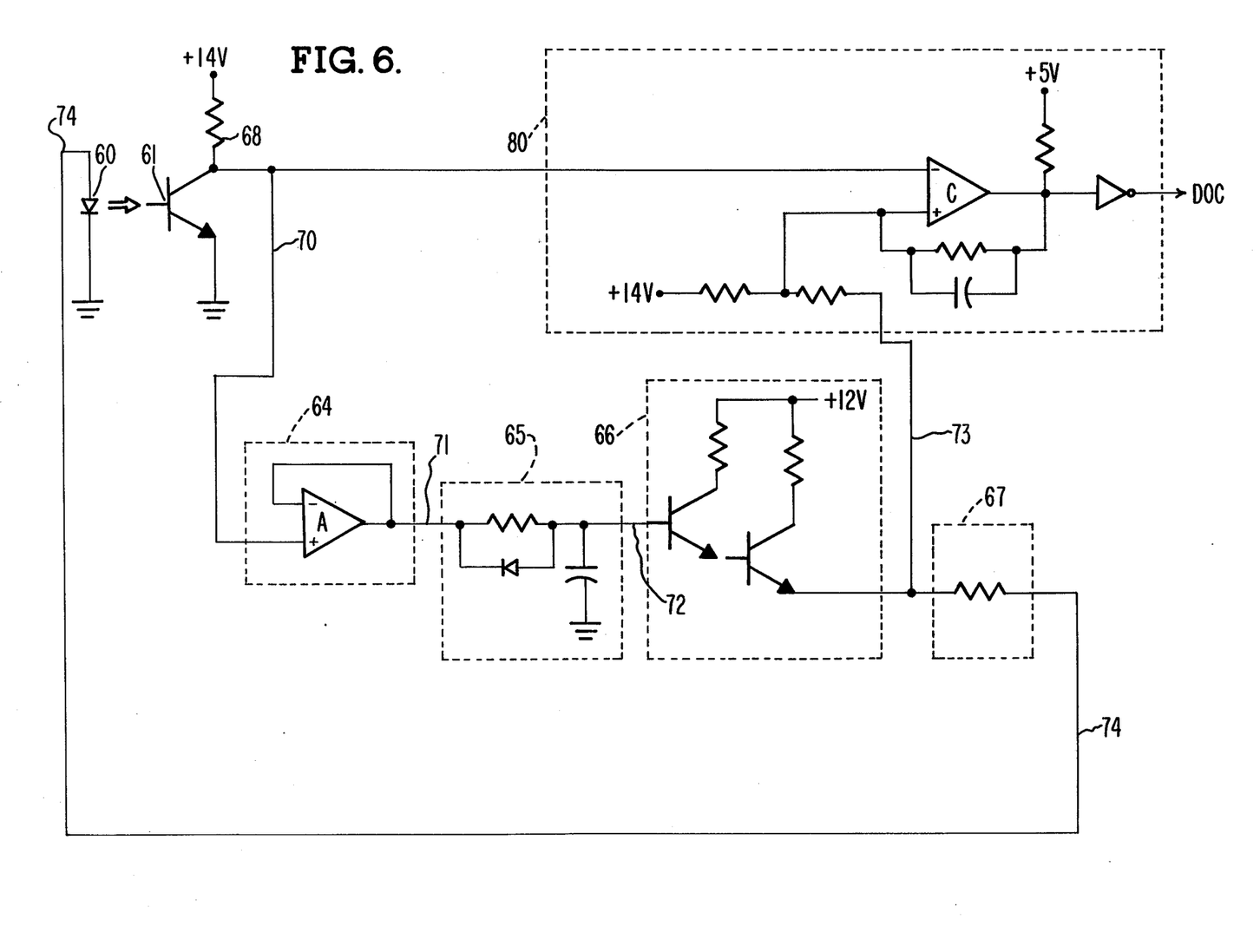
FIG. 6 shows an alternate document present indicator.

FIG. 6 shows a document present indicator that may be used to replace the document present indicator provided by comparator 33 in FIG. 3. This document present indicator is provided by a LED 60 (such as a Spectronics SE-5455) and a phototransistor 61 (such as a Spectronics SD-5443) which may be located on opposite sides of the transport path 11 and vertically under the LED 14 and the phototransistor 15. The electronics formed by an amplifier 64, a one-way low pass filter 65, a darlington driver 66 and a current sense resistor 67 provide a closed loop around the LED 60 and the photo-transistor 61. When no document is present between the LED 60 and the phototransistor 61, the current through the phototransistor 60 and the resistor 68 is relatively large and provides approximately +5 to +7 volts on conductor 70. When a document is present between the LED and the phototransistor, the voltage on conductor 70 goes up to approximately +14 volts. The unity gain buffer amplifier 64 provides the same voltage on conductor 71 as is present on conductor 70. Conductor 71 is input to low pass filter 65 which has a long, positive going voltage, time constant and a short, negative going voltage, time constant. Thus, the voltage on conductor 72 at the output of filter 65 goes down rapidly when the voltage on conductor 71 goes down; and the voltage on conductor 72 goes up slowly when the voltage on conductor 71 goes up. The voltage on conductor 72 is input to a darlington current amplifier 66 such that the voltage on conductor 73 tracks but is slightly lower (about 1.4 volts less) than the voltage on conductor 72. This voltage is fed to the LED 60 via the resistor 67 and the conductor 74. The purpose of the closed loop is to compensate for dirt in the track between the LED 60 and the phototransistor 61 when no document is present and to compensate for the aging of the LED and the phototransistor. Thus, with no document present, if the current through the phototransistor is lower, the voltage on conductors 70, 71, 72 and 73 increases to provide more current through the LED 60 to raise the phototransistor current via the closed loop. When a document is present between the LED and phototransistor, the long time constant of the filter 65 provides that the LED current increases very slowly. At the end of each document, the short time constant of the filter 65 provides that the LED current rapidly reverts to its closed loop, dirt and age compensating value. Thus, the closed loop provides long term dirt and aging compensation, but provides little change during the time a document is present. The comparator circuit 80 monitors the voltage on conductor 70 and is set to switch at approximately +8 volts. However, the voltage on conductor 73 is fed back to the comparator where a resistive divider adjusts the comparator threshold voltage. Thus, as the voltage on conductor 70 raises with no document present to compensate for dirt, the voltage on conductor 73 raises and the threshold of the comparator is also raised. In FIG. 6, the amplifier labeled A may be of the UA747 type powered by +14 vdc and −12 vdc; and the comparator labeled C may be of the CA339 type powered by +24 vdc and ground. This document present indicator may be used in place of the document present indication provided by comparator 33.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

What is claimed is:

1. An apparatus for detecting a document jam in a system that moves documents, said documents having first and second broad, opposite surfaces; said apparatus comprising:
    means located adjacent the first surface of said moving document for illuminating at least a portion of said moving document;
    means located adjacent the opposite surface of said moving document for detecting the magnitude of light that passes through translucent portions of the document as it is between said illuminating means and said detecting means; and electronic means connected to said detecting means for indicating a document jam when the translucency of said document is generally unchanged for a period of time while the document is between the illuminating means and the detecting means.

2. The jam detecting apparatus according to claim 1 wherein said indicating means indicates a document jam when the translucency of said document is generally unchanged for a predetermined time while the document is between the illuminating means and the detecting means.

3. The jam detecting apparatus according to claim 1 wherein said indicating means comprises means for detecting rapid changes in the output of said detecting means.

4. The jam detecting apparatus according to claim 3 wherein said indicating means further comprises;
means for remembering rapid changes in the output of said detecting means; and
means for deciding when the output of said detecting means is generally unchanged.

5. The jam detecting apparatus according to claim 4 wherein said indicating means further comprises means for designating when a document is present between said illuminating means and said detecting means.

6. The jam detecting apparatus according to claim 4 wherein said illuminating means comprises an infrared light source.

7. The jam detecting apparatus according to claim 4 wherein said detecting means provides a non-linear relationship between the light it senses and its electrical output.

8. A document processing apparatus that processes moving documents and indicates a document jam therein, comprising:
a transport path for guiding documents;
means for moving documents along said transport path,
means located on one side of said transport path for illuminating at least a portion of the moving document as it passes along said transport path;
means located on the other side of said transport path for detecting light from said illuminating means that passes through translucent portions of the document as the document passes along said transport path; and
electronic means connected to said detecting means for indicating a document jam when the translucency of the document is generally unchanged for a period of time while the document is between the illuminating means and the detecting means.

9. The document processing apparatus according to claim 8 wherein said indicating means indicates a document jam when the translucency of the document is generally unchanged for a predetermined time while the document is between the illuminating means and the detecting means.

10. The document processing apparatus according to claim 8 wherein said indicating means comprises means for detecting rapid changes in the output of said detecting means.

11. The document processing apparatus according to claim 10 wherein said rapid change detecting means comprises a high pass filter.

12. The document processing apparatus according to claim 10 wherein said indicating means further comprises:
means for remembering rapid changes in the output of said detecting means; and
means for deciding when the output of said detecting means is generally unchanged.

13. The document processing apparatus according to claim 12 wherein:
said remembering means comprises a low pass filter; and
said deciding means comprises a trigger circuit.

14. The document processing apparatus according to claim 12 wherein said indicating means further comprises means for designating when a document is present between said illuminating means and said detecting means.

15. The document processing apparatus according to claim 14 wherein said document present designating means monitors the current through said light detecting means and indicates a document is present when the current is less than a predetermined value.

16. The document processing apparatus according to claim 8 wherein said indicating means comprises:
means for amplifying the output of said detecting means;
means responsive to the output of said amplifying means for detecting rapid changes in the output of said amplifying means;
comparator means responsive to the output of said rapid change detecting means for indicating when said rapid changes exceed a predetermined value;
means responsive to the output of said comparator means for remembering the output of said comparator means; and
deciding means responsive to the output of said remembering means for deciding when a document jam has occurred.

17. The document processing apparatus according to claim 16 wherein:
said amplifying means comprises an amplifier circuit;
said rapid change detecting means comprises a high pass filter;
said comparator means comprises a comparator circuit;
said remembering means comprises a low pass filter; and
said deciding means comprises a trigger circuit.

18. The document processing apparatus according to claim 8 wherein said illuminating means comprises an infrared light source.

19. The document processing apparatus according to claim 18 wherein said infrared light source comprises a light emitting diode.

20. The document processing apparatus according to claim 8 wherein said detecting means provides a nonlinear light input to electrical output transfer characteristic.

21. The document processing apparatus according to claim 20 wherein said detecting means provides a logarithmic light input to electrical output transfer characteristic.

22. The document processing apparatus according to claim 20 wherein said detecting means comprises a phototransistor.

23. A process for moving documents and detecting when the documents jam, comprising:
providing a transport path for guiding the documents;

moving documents along the transport path;

illuminating a portion of the document from one side the transport path;

detecting light that passes through translucent portions of the document; and indicating a document jam when the translucency of the document is generally unchanged for a period of time while the document is being illuminated and the light that passes through translucent portions of the document is being detected.

24. The process according to claim 23 wherein the step of indicating a document jam comprises detecting rapid changes in the light that passes through translucent portions of the document.

25. The process according to claim 24 wherein the step of indicating a document jam further comprises:
remembering rapid changes in the light that passes through translucent portions of the document; and
deciding when the light that passes through translucent portions of the document is generally unchanged.

* * * * *